(12) United States Patent
Cappello et al.

(10) Patent No.: US 11,497,999 B2
(45) Date of Patent: Nov. 15, 2022

(54) METHOD AND SYSTEM FOR DETERMINING BLENDING COEFFICIENTS

(71) Applicant: Sony Interactive Entertainment Inc., Tokyo (JP)

(72) Inventors: Fabio Cappello, London (GB); Oliver Hume, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 20 days.

(21) Appl. No.: 16/740,707

(22) Filed: Jan. 13, 2020

(65) Prior Publication Data

US 2020/0222804 A1   Jul. 16, 2020

(30) Foreign Application Priority Data

Jan. 16, 2019   (GB) ..................... 1900595

(51) Int. Cl.
| | |
|---|---|
| *A63F 13/52* | (2014.01) |
| *A63F 13/60* | (2014.01) |
| *G06N 20/00* | (2019.01) |

(52) U.S. Cl.
CPC .............. *A63F 13/52* (2014.09); *A63F 13/60* (2014.09); *G06N 20/00* (2019.01); *A63F 2300/6009* (2013.01); *A63F 2300/6607* (2013.01)

(58) Field of Classification Search
CPC .. A63F 13/52; A63F 13/60; A63F 2300/6009; A63F 2300/6607; G06N 20/00
See application file for complete search history.

(56) References Cited

U.S. PATENT DOCUMENTS

| | | | | |
|---|---|---|---|---|
| 9,652,879 | B2 * | 5/2017 | Aguado | ................. G06T 13/00 |
| 9,741,146 | B1 * | 8/2017 | Nishimura | .............. G06T 13/40 |

(Continued)

FOREIGN PATENT DOCUMENTS

| | | |
|---|---|---|
| EP | 3683772 A1 | 7/2020 |
| GB | 2512302 A | 10/2014 |

OTHER PUBLICATIONS

Combined Search and Examination Report for corresponding GB Application No. 1900595.8, 3 pages, dated Jul. 9, 2019.

(Continued)

*Primary Examiner* — Malina D. Blaise
(74) *Attorney, Agent, or Firm* — Matthew B. Dernier, Esq.

(57) ABSTRACT

A method of determining blending coefficients for respective animations includes: obtaining animation data, the animation data defining at least two different animations that are at least in part to be simultaneously applied to the animated object, each animation comprising a plurality of frames; obtaining corresponding video game data, the video game data comprising an in-game state of the object; inputting the animation data and video game data into a machine learning model, the machine learning model being trained to determine, based on the animation data and corresponding video game data, a blending coefficient for each of the animations in the animation data; determining, based on the output of the machine learning model, one or more blending coefficients for at least one of the animations, the or each blending coefficient defining a relative weighting with which each animation is to be applied to the animated object; and blending the at least simultaneously applied part of the two animations using the or each determined blending coefficient, the contribution from each of the at least two anima- (Continued)

tions being in accordance with the or each determined blending coefficient.

15 Claims, 3 Drawing Sheets

(56) References Cited

U.S. PATENT DOCUMENTS

| | | | | |
|---|---|---|---|---|
| 9,861,898 | B2* | 1/2018 | Miura | H04N 21/4781 |
| 10,825,220 | B1* | 11/2020 | Chang | G06T 13/00 |
| 2008/0273039 | A1* | 11/2008 | Girard | G06T 13/00 |
| | | | | 345/475 |
| 2009/0195544 | A1* | 8/2009 | Wrinch | G06T 13/40 |
| | | | | 345/473 |
| 2010/0134501 | A1* | 6/2010 | Lowe | G06T 13/40 |
| | | | | 345/473 |
| 2014/0285513 | A1* | 9/2014 | Aguado | G06T 13/40 |
| | | | | 345/620 |
| 2017/0256086 | A1* | 9/2017 | Park | G06T 7/73 |
| 2021/0166459 | A1* | 6/2021 | Miller, IV | G06F 3/011 |

OTHER PUBLICATIONS

Extended European Search Report for corresponding EP Application No. 19213906.1, 17 pages, dated May 14, 2020.
He Zhang, et al., "Mode-adaptive neural networks for quadruped motion control", AMC Transactions on Graphics, vol. 37, No. 4, Article 145, pp. 1-11, Aug. 1, 2018.
Daniel Holden, et al., "Phase-functioned neural networks for character control", AMC Transactions on Graphics, vol. 36. No. 4., Article 142, pp. 1-13, Jul. 1, 2017.
T. Pejsa, et al., "State of the Art in Example-Based Motion Synthesis for Virtual Characters in Interactive Applications", Journal Compilations, The Eurographics Association and Blackwell Publishing, Computer Graphics Forum, vol. 29, No. 1, pp. 202-206, Mar. 1, 2010.
Examination Report for corresponding GB Application No. 1900595. 8, 5 pages, dated Aug. 13, 2021.

* cited by examiner

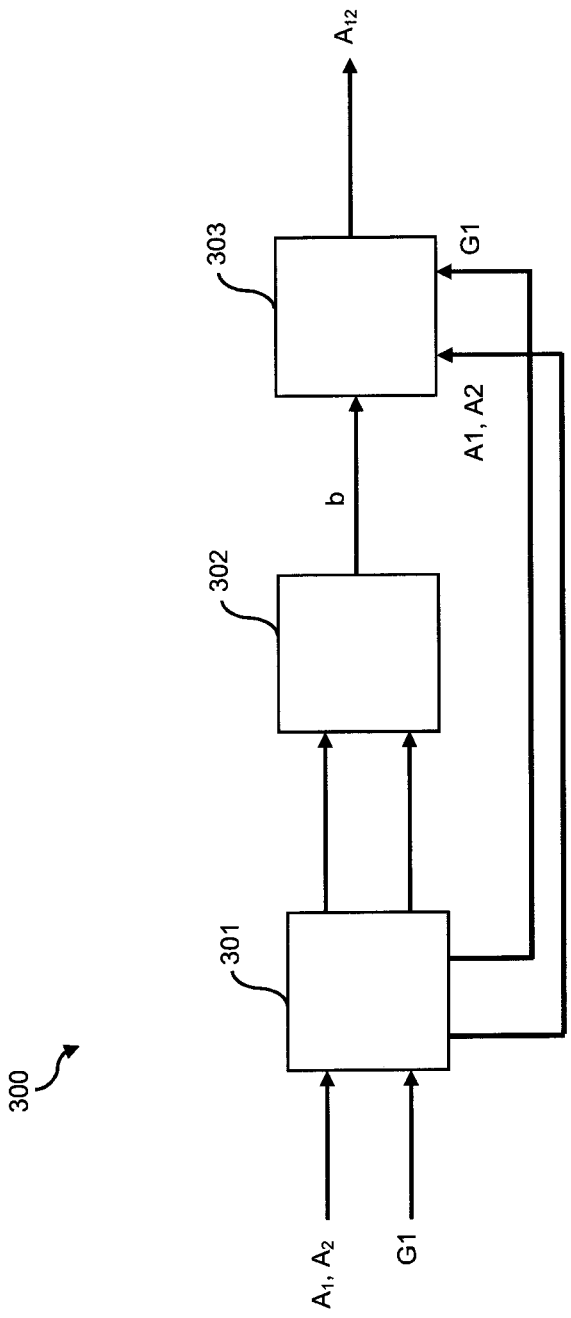

METHOD AND SYSTEM FOR DETERMINING BLENDING COEFFICIENTS

BACKGROUND OF THE INVENTION

Field of the Invention

The present disclosure relates to a method and system for determining blending coefficients for blending different animations together.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In computer-generated animation, it is common to generate different animations for an animated object. The animated object may be, for example, a humanoid character, and the different animations may correspond to e.g. an idle cycle, a walk cycle, a run cycle, a sparring cycle, and so on. When switching between different animations, the animations are usually blended together so as to create a composite animation that includes a contribution from each animation. This prevents the character from appearing to 'pop' as the object transitions from one type of movement to another. The degree of blending is typically controlled by blending coefficients, which define the relative contribution from each of the animations in animating the character.

In video games, the manner in which a video game character performs certain motions may be dependent on some in-game variable, such as e.g. the character's health, speed vector, stamina level, etc. Typically, the relationship between in-game variables and animation blending coefficients is defined manually by an animator. This may require an animator to explicitly define, for each type of character and each animation within a given combination, a relationship between the in-game variables and the animations in the respective combination. As will be appreciated, this may become a time-consuming process, especially where there are large number of characters, in-game variables, and animations that are to be blended together. Clearly, defining relationships between in-game variables and blending coefficients in this way is an inefficient use of an animator's time.

Moreover, manually defining relationships between in-game variables and blending coefficients for combinations of animations is prone to error. This is because the animator is typically unable to foresee all of the possible combinations of in-game variables that may affect the character's movement. It may be, for example, that there is a power up in a video game that greatly increases the running speed of the character, but that the blending coefficient for combining e.g. the idle cycle and running cycle is not sufficiently weighted towards the running cycle. As a result, the character may appear to move with increased speed but in an unrealistic manner (i.e. the speed of leg movement being out-of-sync with the translational movement).

The present invention seeks to alleviate or at least mitigate against the above-identified problems.

SUMMARY OF THE INVENTION

According to a first aspect disclosed herein, there is provided a method in accordance with claim 1.

According to a second aspect disclosed herein, there is provided a system in accordance with claim 9.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 schematically shows an example of a system for determining blending coefficients for respective animations.

DESCRIPTION OF THE EMBODIMENTS

Computer-generated animations are often used in different types of video content, such as the video output during the playing of a video game. In video games, the animation is typically of an articulated object, such as, for example, a humanoid character. The object is usually represented by a surface representation that forms the skin or mesh of the object, and a hierarchical set of interconnected bones forming the three-dimensional skeleton or 'rig' that can be manipulated by an animator so as to animate the mesh. In some cases, the bones may not be hierarchical and may simply allow one portion of the object to be configured differently with respect to another. It will be appreciated that whilst the skeleton or 'rig' may provide sufficient representation and articulation of limbs, head, torso and the like for the desired amount of animation control, it may not directly conform to an anatomical skeleton or part thereof of the represented object.

In the art of computer animation, creating and manipulating the bones of an object is referred to as rigging, whilst the binding of different parts of the mesh to corresponding bones is called skinning. In rigging, each bone is associated with a three-dimensional transformation (sometimes referred to herein as a 'transform') that defines at least one of a position, scale and orientation of a corresponding bone. The transformation may also define a parent bone to which a child bone is attached. In such cases, the transformation of the child is the product of its parent transform and its own transform. This means, for example, that if the skeleton defines a humanoid character, then movement of the thighbone will result in the lower leg being moved too. The transformations may be defined for each successive frame, for each bone, such that the temporal variation in the transformations corresponds to the object performing a particular motion.

The bones of the object are each associated with a respective portion of the object's visual representation. In the most common case of a polygonal mesh character, the bone is associated with a group of vertices; for example, in a model of a human being, the e.g. 'right upper arm' bone would be associated with the vertices making up the polygons in the model's right upper arm. Portions of the character's skin are normally associated with multiple bones, each one having a scaling factor called a vertex weight or blend weight. This process of skinning the character is typically done by a graphical processing unit (GPU), using a shader program.

Figure 1A:
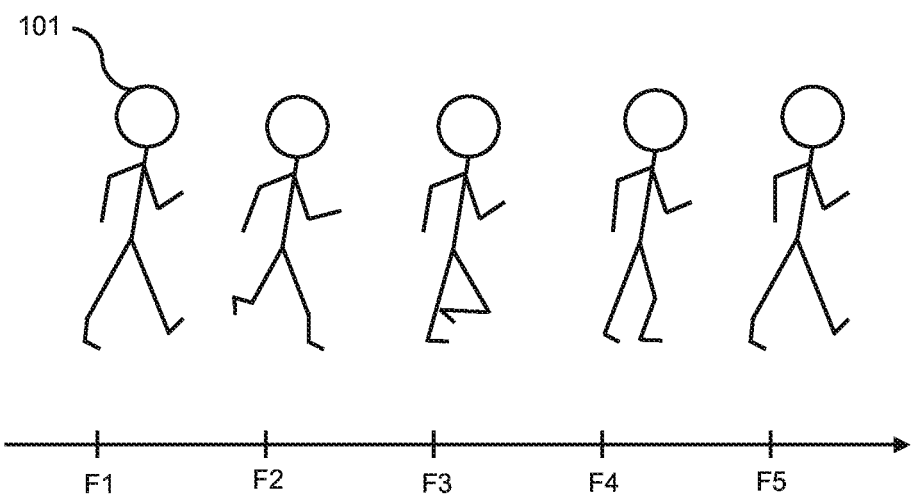
FIG. 1A schematically shows an example of a walking animation cycle.

Referring now to the drawings, wherein like reference numerals designate identical or corresponding parts throughout the several views, FIG. 1A shows an example of a plurality of frames, F1-F5, of an animated object. In FIG. 1A, the object is of a human character 101 and the character has been animated so as to perform a walking motion. The animation shown in FIG. 1 may correspond to a loop-animation or a 'walk cycle' defined by an animator for a character in a video game. This may be, for example, the animation that is displayed in response to a player moving their character in a particular direction (in this case, to the right) or as part of a cut-scene. It may be, for example, that an animator creates a different animation for walking in a different direction (e.g. forwards, backwards, right, left).

In FIG. 1A, each successive frame depicts the character at a different respective pose. The pose of the character is defined in terms of bones corresponding to the head, spine, upper arms, lower arms, upper legs, lower legs and feet, and their corresponding transformations. The transforms for each bone are defined for each frame, such that character is depicted as walking in the manner shown, as the frames are successively output for display. It will be appreciated that FIG. 1A is a simplified example of an animation, and that in reality the character may be non-human and/or may be formed of different bones or a different number thereof.

It will be further appreciated that the bones and transforms for a given computer-generated character need not be character specific. For example, it may be that there are multiple characters in a video game, each sharing substantially similar skeletons to which the transforms corresponding to e.g. walking can be applied. However, for some characters, it may be that the physiologies are substantially different, and so the transforms corresponding to e.g. walking need to be re-defined for that character's specific set of bones.

Figure 1B:
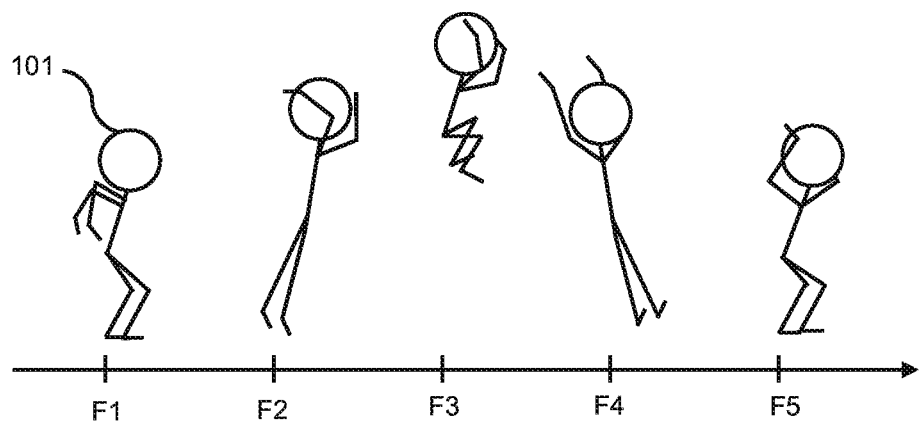
FIG. 1B schematically shows an example of a jumping animation cycle.

Generally, an animator will create multiple different animations for a given object. Here, an 'animation' refers to a different type of motion (corresponding to a variation in pose over a plurality of frames). In a simple example, this may include creating a 'jump' animation and a 'walk' animation, for the animated object. The jump animation may correspond to the character launching themselves into the air, as shown in FIG. 1B. The walk animation may correspond to a walk cycle, as shown in previously in FIG. 1A. Again, the changes in pose corresponding to the 'jump' animation may be defined in terms of bones and corresponding transforms, the transforms for each bone changing over successive frames in a manner that corresponds with the character performing a jumping action.

When rendering the animated object, it is undesirable to suddenly switch from one animation to another, since this will result in the object's movement appearing jerky and unnatural. To avoid this, the different animations are usually blended together so as to create a smooth transition between them. This may involve, for example, assigning each animation to an animation layer, and assigning each layer a weight (i.e. a blending coefficient). The weight defines the extent to which that animation layer will contribute to the final blended result. In the example of FIGS. 1A and 1B, this may involve blending the 'walking' and 'jumping' animations together, so as to depict the character as jumping from a walking position, as opposed to suddenly launching into a jump.

As will be appreciated, when combining animations, it may be necessary to adapt the playback speed of each animation, to ensure that corresponding points in each animation remain synchronized. In the example of a humanoid character walking at different speeds, this ensures that the footsteps remain synchronised, despite different animations being used to animate the character. The playback speed of each animation may be adjusted in accordance with the weighting associated with the corresponding animation layer, for example.

In video games, the contribution from each animation in the blended result will typically depend on some in-game parameter. For example, it may be that a video game character is able to walk, jog and run, and that a corresponding animation exists for each of these motions. The extent to which the character is depicted as walking, jogging and running, may be depend on some in-game parameter, such as the character's 'speed'. For example, the 'speed' may take a value between '0' and '1' and the weighting of the running animation may be proportional to the speed parameter (and conversely, the weighting of the walking animation may be inversely proportional to the speed value). If the speed is closer to '1', then it may be that the running animation is the dominant animation in the blended result. In turn, this may cause the character to appear to be jogging quickly or running. The speed associated with a video game character may depend on an input provided by a user, for example, moving the analogue stick whilst tapping 'x' may correspond to a run, whilst moving just the analogue stick may correspond to a walk.

Typically, the relationship between an in-game variable and a blending coefficient for a given animation layer is defined manually by an animator. In most cases, a simple linear relationship is used for convenience. As will be appreciated, the definition of a relationship between an in-game variable and a corresponding blending coefficient may be a time-consuming and burdensome process, especially if this needs to be defined for multiple character skeletons and the combinations of animations applied thereto. This problem is further exacerbated if there are a large number of in-game variables to be considered. For example, it may be that a character has multiple different states (e.g. wounded, angry, fighting, tired, etc.) and that a blending coefficient needs to be defined for each of the animation cycles relevant to those states.

It would therefore be desirable if this burden on animators in defining relationships between in-game variables and blending coefficients could be alleviated in some way. Moreover, it would be desirable if this relationship could be defined in a manner that is less prone to error, and that allows for richer and more flexible mappings between in-game variables and blending coefficients A method for automating such a process will be now be described in relation to FIG. 2.

Figure 2:
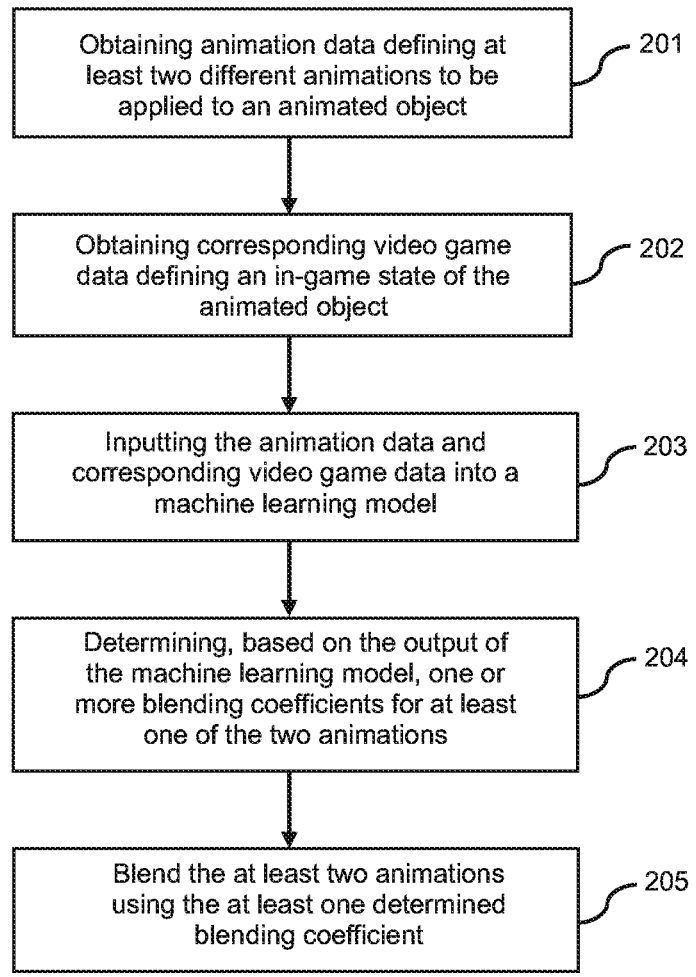
FIG. 2 shows an example of a method for determining blending coefficients for blending animations together.

FIG. 2 shows schematically an example of a method of determining blending coefficients for animations. In FIG. 2, the method is described in relation to a set of animation and video game data that is to be processed; the training required for executing the method will be described later.

At a first step 201, animation data is obtained. The animation data comprises at least two different animations that are to be applied to an animated object in a video game (non-limiting examples being the animation sequences corresponding to walking and jumping as illustrated in FIGS. 1A and 1B). Each animation comprises a plurality of frames, with each frame defining a respective pose of the animated object. Generally, the animated object will be a computer-generated character, such as e.g. a humanoid character, comprising a plurality of bones defining a skeleton of the character. The pose of the computer-generated character may be defined in terms of bones and corresponding transforms, with the transforms defining for each bone, at least one of a position, orientation, scale and parent of that bone, relative to a default position, scale and orientation (such as e.g. the character standing in a T-pose). The transforms may be represented as float values for example, as is the case in the Unreal 4™ game engine.

It will be appreciated that equivalent forms of pose data are also considered to be within the scope of the invention, such as end-point or key-point definitions of a character pose (e.g. defining the position of a tip of a finger, toe, head etc., and relying on skeletal constraints and optionally the generated pose for a prior frame to generate the current pose), which may be preferable for use with a physics-driven game engine, for example, or video data (as also discussed later herein), from which pose data may be inferred, either from skeletal modelling or similar pose estimation techniques. Hence more generally the animation data comprises, for each of the at least two different animations, a sequence of bone and/or skeleton state data, for example comprising temporal variations of at least some of the bones of a computer-generated character, from which a corresponding sequence of skeletal poses can be derived (for example based directly on some or all of the bone and/or skeleton state data, and/or using some or all of the bone and/or skeleton state data in combination with skeletal constraints and the like).

The animations may correspond to respective animation cycles, such as e.g. idle, walking, jogging, running, jumping, sparring, falling, etc. that are to be applied to the computer-generated character. As noted above, the different animation cycles may be defined in terms of temporal variations of at least some of the bones of the computer-generated character. For example, the walking motion may be defined in terms of changes in pose of the character's legs, arms, shoulders, etc., over successive frames.

The animation data may be generated by an animator, during the development of a video game. For example, through the use of a game engine that allows animators to define characters and their animation. This data may be obtained in the sense that is it received (e.g. as a file) at a computing device, wherein the computing device is configured to process that data (described later in relation to FIG. 5).

At a second step 202, video game data corresponding with the animation data is obtained. The video game data comprises at least one in-game variable defining a state of the animated object in the video game, when the at least two different animations are to be applied to the animated object. The in-game variable may define at least one of: a physical state of the animated object, a speed value or velocity vector associated with the animated object, a context associated with the animated object, etc. Generally, the in-game variable defines any state of the animated object that affects the movement of the animated object.

The physical state of the animated object may include e.g. an indication of a character's health, or damage that has been taken by the animated object. The physical state may also include e.g. a stamina level, or tiredness associated with the character. In yet further examples, the physical state may provide an indication of the height and/or weight of the character. As will be appreciated, any one or more these may affect how the character moves, and how therefore different animation cycles are to be blended together, so as to represent that movement to varying degrees. In a simple example, it may be that the degree of blending between a walking and running animation cycle is biased towards running, with the amount of biasing being proportional to the character's health.

The velocity vector of the animated object provides an indication of the speed and direction which the animated object is moving in the video game. Generally, this will be dependent on an input provided by a user, e.g. controller inputs. The velocity vector may also depend on any special items or power-ups that the character has acquired in the game—i.e. it may be that a particular item or power-up greatly increases the speed of the character. Again, the velocity vector of the character may influence how different animation cycles are blended together, and the contribution from each in the final blended result.

The emotive state provides an indication of an emotive state of the animated object. For example, it may be that the movement of the character depends on a level of anger or sadness, and that the blending between different animations depends on an extent of one or more emotions that the character is experiencing. As an example, Kratos in the game God of War® has an associated 'RAGE' level, and it may be that e.g. the bias towards running over walking is dependent on the Kratos' rage level.

The context provides an indication of a context within the video game that is being experienced by the animated object. It may be, for example, that the in-game variable indicates that a video game character is in or approaching a combat scenario, and so it may be that the blending between e.g. an idle animation cycle and sparring animation cycle is to be biased towards the sparring animation cycle, based on whether, or how close, the character is to the combat scenario.

At a third step S203, the animation data and corresponding video game data is input to a machine learning model. The machine learning model is trained to determine, for at least one of the animations in the animation data, and at least one in-game variable in the corresponding video game data, a respective blending coefficient. As mentioned previously, the blending coefficient defines a relative weighting with which at least one of the animations is to be applied to the animated object, in combination with one or more other animations.

In examples where only two animations are to be blended together, it may be sufficient to determine a blending coefficient for one of the animations. For example, it may be determined, based on the output of the machine learning model, that e.g. the 'walking' animation cycle is to be assigned a blending coefficient of 0.4, and it can therefore be inferred that the other animation, e.g. a running cycle, is to be assigned a blending coefficient of 0.6. Here, assigning a blending coefficient to a given animation may correspond to annotating each frame in that animation with an identifier, indicating the blending coefficient associated with that animation. The identifier may then be used by a game engine, when rendering the blended combination of the two animations, for example.

In other examples, the machine learning model is trained to determine a blending coefficient for each of the at least two animations in the animation data. For example, it may be that each animation is assigned to an animation layer, and that the machine learning model is trained to determine, for each animation layer, a respective blending coefficient. Again, determining a blending coefficient for each animation may involve annotating each frame of the animation with an identifier indicating the blending coefficient that is to be applied to that animation.

The machine learning model may comprise at least one of a trained neural network, such as a trained convolutional or recursive neural network (CNN, RNN respectively), a multilayer perceptron (MLP), or restricted Boltzmann machine, for example. Ultimately, any suitable machine learning system may be used. The machine learning model receives as an input, at least two different animations; for example, corresponding single frames or 'focal frames' from the two animations, optionally with one or more frames preceding and/or following one or both of the focal frames at issue to provide motion context, with the input data being the animation data for that frame and/or an abstracted representation of that data, optionally with the amount of any abstraction or any compression being less for the focal frames than for any motion context frames. It will be appreciated that if the number of motion context frames equals the number of frames in the animation sequence then in principle the machine learning model can receive both the entire animation sequences, and the notion of a focal frame becomes irrelevant. Consequently it is envisaged as possible to input individual focal frames, or subsections of the animations, or the entire animation sequence to a respective machine learning model trained using that type of input.

At a fourth step, S204, one or more blending coefficients for at least one of the animations is determined based on the output of the machine learning model. The or each blending coefficient defines a relative weighting which each animation is to be applied to the animated object. That is, the at least two different animations that are to be applied to the animated object and one or more in-game variables currently associated with the animated object are input to the machine learning model, and in response thereto, it outputs a blending coefficient that is to be applied when blending the at least two animations together.

Depending on the nature of the input, the output may also be different. If corresponding individual focal frames are used (with or without any motion context information), then a blending coefficient for one or each of the corresponding focal frame pairs may be output, enabling the blending coefficient to change over the sequence of focal frames that are used as the input. Meanwhile if the two entire animation sequences are input then either a single blending coefficient for one or each entire animation sequence may be generated, or multiple blending coefficients may be output. This latter option however either requires that the machine learning model is responsive to the number of frames in a given animation sequence, or that the output multiple blending coefficients are then fitted to the actual number of frames in the sequence. Consequently a machine learning model based on providing blending coefficients for focal frames (with or with any context frames) will typically be easier to train and/or use, given the same available training data.

The machine learning model may be trained using supervised deep learning, with previously generated animation data and corresponding video game data being used as training data.

The previously generated animation data includes different sets of animations, with each set corresponding to a combination of animations that are at least in part to be simultaneously applied to a given animated object (the overlap may not be exact for example because the animations are of different lengths, or the transition from one sequence to another works best from a point partway through one or both animation sequences). The previously generated animation data also includes, for each animation in a given set, the blending coefficients associated with the respective animations. The blending coefficients will have been defined manually by an animator, during the animation process. The blending coefficients may be obtained from e.g. metadata that is stored in association with each animation. Alternatively, the blending coefficients may be obtained from the animations themselves, where e.g. each frame comprises a blending coefficient.

The previously generated animation data may comprise at least some of the bones and transforms defining each of the different movements performed by the bones of a character's skeleton. In some examples, the previously generated animation data may correspond to e.g. humanoid skeletons. In other examples, the previously generated animation data may correspond to a plurality of different skeleton types (and therefore having different or additional bones associated therewith), corresponding to e.g. different characters in a video game.

As mentioned above, the machine learning model is also trained with video game data corresponding with the animation data. The video game data comprises one or more in-game variables defining an in-game state of the animated object, wherein the animated object corresponds to the animated object to which the at least two animations in the previously generated animation data is to be applied. As above, the video game data may provide e.g. an indication of a physical state, velocity vector, emotive state, context associated with the animated object.

The blending coefficients for a given set of animations may be dependent on multiple in-game variables, and the relationship may be different depending on different combinations of in-game variables. For example, it may be that e.g. a physical state corresponding to 'injured' takes precedence over an increased velocity vector, and so the degree of blending between a 'walking' and 'running' animation cycle needs to be blended more towards walking as opposed to running, or changes over the course of the transition to reflect the speed increase becoming more difficult for the injured character. By taking into account different in-game variables and/or combinations thereof, the machine learning model can be trained to learn a relationship between different in-game variables (and/or combinations) and corresponding blending coefficients. In some examples, such as that of the injured character above, this may result in a non-linear relationship between in-game variables and blending coefficients being determined by the machine learning model.

It will be appreciated that, by training the machine learning model with a large number of different animations (optionally for a large variation of skeletons), the model will be implicitly trained to recognize different animations. For example, the machine learning model may be trained to identify, for each animation in a set, a learnt animation (or representation thereof) that that animation corresponds to. This may correspond to learning a generic representation of different animation cycles and then determining, for a current animation (or representation thereof), a learnt representation that corresponds most closely with that animation, i.e. based on an associated confidence value. Once the animations in a given set have been identified, and the corresponding in-game variables are known, the trained machine learning model can then map the animations in the current set and in-game variable(s) associated therewith to one or more corresponding blending coefficients (i.e. using the learnt relationship).

At a fifth step S205, the at least two animations are blended together using the determined blending coefficient(s), the contribution of each animation in the final blended result being in accordance with the determined blending coefficient(s). In some examples, each animation is assigned a respective blending coefficient and the blending is performed based on each of the blending coefficients. In such examples, each blending coefficient is equal to or greater than zero and equal to or less than 1, i.e. the blending coefficient defines the fractional contribution of each animation in the final blended result. The blending may be performed by a game engine, for example. In FIG. 3, the blended combination of animations is shown as output $A_{12}$.

The blended combination of the at least two animations may then be output for display at a display device. This may be output to e.g. an animator, for checking whether the result is a result that would be expected for that combination of animations and a corresponding in-game variable. In addition or alternatively, it may be that the animations and in-game variables are generated whilst the video game is being played, and that the animations are blended and output for display, in accordance with the determined blending coefficient(s).

FIG. 3 shows schematically an example of a system 300 for determining blending coefficients for respective animations to be applied to an animated object. In FIG. 3, the system 300 corresponds to a system that has been trained to determine blending coefficients in any of the manners described above.

The system 300 comprises an input unit 301 configured to obtain animation data and corresponding video game data. The animation data and corresponding video game data may correspond to any of the animation data and corresponding video game data described previously. For example, the animation data may define at least some of the bones and corresponding transforms for a given video game character, with the bones and corresponding transforms being defined for each of the frames of a respective animation in the animation data. The video game data may comprise at least one in-game variable defining a state of the character in the video game. In FIG. 3, the animation data is shown as comprising two animations $A_1$ and $A_2$ and the corresponding video game data comprising an in-game variable G1. It will be appreciated that this is just an illustrative example and that in other examples, the animation data and video game data may comprise more than two animations and in-game variables respectively.

The obtained animation data and video game data is input to a modelling unit 302 (for example using any of the input forms described previously herein). The modelling unit 302 is trained to determine, based on the animation data and corresponding video game data, a blending coefficient for at least one of the animations in the animation data. Preferably, the modelling unit 392 is trained to determine a blending coefficient for each animation in the animation data. As described previously, it may be that each animation is assigned to a respective animation layer, and that the blending coefficient associated with a given animation layer is used by a game engine when rendering the combination of the animation layers. As before, the blending coefficient defines a relative weighting with which each animation is to be applied to the animated object.

The modelling unit 302 may be trained using supervised deep learning to determine a relationship between animation data and corresponding video game data. As described previously, the training may be performed using previously generated animation data and corresponding video game data, wherein the animation data includes a plurality of sets of animations that are to be applied to an animated object and the corresponding blending coefficients associated with each of the animations in a given set. The modelling unit 302 may comprise a neural network that is trained to map animation data and corresponding video game data to blending coefficients. Any suitable machine learning system that can be trained to map the relationship between animation data and corresponding video game data to blending coefficients may be used.

The modelling unit 302 is configured to output at least one blending coefficient for an animation in the obtained animation data. In FIG. 3, this is shown as output 'b'. In preferred examples, the modelling unit 302 is configured to output a blending coefficient for each animation in the obtained animation data (e.g. for $A_1$ and $A_2$) (for example on a focal frame basis or a whole-animation basis).

The blending coefficient(s) output by the modelling unit is (are) then provided to a blending unit 303, that is configured to blend the animations in the animation data together, using the blending coefficient(s) output by the blending unit 303. The blending unit 303 may comprise a game engine that is configured to receive the blending coefficients associated with an (or each) animation layer in the animation data, and to render the animated object by blending the animations in accordance with the determined blending coefficients. The blended animation may be output at a display device (not shown) for example.

The techniques described herein may be implemented in hardware, software or combinations of the two as appropriate. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of determining blending coefficients for respective animations, the method comprising:
obtaining animation data, the animation data defining at least two different animations that are at least in part to be simultaneously applied to an animated object, each animation comprising a plurality of frames;

obtaining corresponding video game data from an executing video game application, the video game data comprising an in-game state of the animated object;

inputting the animation data and video game data into a machine learning model, the machine learning model being trained to determine, based on the animation data and corresponding video game data, a blending coefficient for at least one of the animations in the animation data;

determining, based on an output of the machine learning model, one or more blending coefficients for at least one of the animations, the or each blending coefficient defining a relative weighting with which each animation is to be applied to the animated object; and blending the at least simultaneously applied part of the two animations using the or each determined blending coefficient, the contribution from each of the at least two animations being in accordance with the or each determined blending coefficient, wherein the in-game state comprises one or more of:

(i) a physical state of the animated object;
(ii) a stamina level associated with the animated object; and
(iii) a context associated with the animated object, where the context includes a scenario established by the video game application that is being experienced by the animated object.

2. The method according to claim 1, wherein the machine learning model is trained using supervised deep learning, the machine learning model being trained with previously generated animation data and corresponding video game data; and wherein the previously generated animation data includes combinations of animations applied to different animated objects and the corresponding blending coefficients used for animating each of the animated objects.

3. The method according to claim 1, wherein each animation is assigned to an animation layer and wherein the machine learning model is trained to determine a respective blending coefficient for each animation layer.

4. The method according to claim 1, wherein the animated object comprises a computer-generated character, the computer-generated character having a plurality of bones defining a skeleton of the character; and wherein each animation defines a different motion that is to be performed by at least some of the bones of the character.

5. The method according to claim 4, wherein the animation data comprises at least some of the bones of the computer-generated character and corresponding transforms, each transform defining at least one of a position, scale and orientation of a respective bone; and wherein the different motion of at least some of the character's bones for each animation is defined in terms of temporal variations in the transforms of those bones.

6. The method according to claim 1, wherein the in-game state of the animated object comprises a velocity vector associated with the animated object.

7. The method according to claim 1, comprising blending the at least two animations using the determined blending coefficient, the contribution from each of the at least two animations being in accordance with the determined blending coefficient.

8. The method according to claim 1, comprising displaying the blended animation at a display device.

9. A non-transitory, computer readable storage medium containing a computer program that, when run on a computer, cause the computer to implement a method of determining blending coefficients for respective animations, by carrying out actions, comprising:

obtaining animation data, the animation data defining at least two different animations that are at least in part to be simultaneously applied to an animated object, each animation comprising a plurality of frames;

obtaining corresponding video game data from an executing video game application, the video game data comprising an in-game state of the animated object;

inputting the animation data and video game data into a machine learning model, the machine learning model being trained to determine, based on the animation data and corresponding video game data, a blending coefficient for at least one of the animations in the animation data;

determining, based on an output of the machine learning model, one or more blending coefficients for at least one of the animations, the or each blending coefficient defining a relative weighting with which each animation is to be applied to the animated object; and blending the at least simultaneously applied part of the two animations using the or each determined blending coefficient, the contribution from each of the at least two animations being in accordance with the or each determined blending coefficient, wherein the in-game variable comprises one or more of:

(i) a physical state of the animated object;
(ii) a stamina level associated with the animated object; and
(iii) a context associated with the animated object, where the context includes a scenario established by the video game application that is being experienced by the animated object.

10. A system for determining blending coefficients for respective animations the system comprising:

an input unit configured to obtain animation data and corresponding video game data from an executing video game application;

wherein the animation data comprises at least two animations that are at least in part to be applied simultaneously to an animated object, each animation comprising a plurality of frames;

wherein the video game data comprises at least one in-game variable defining a state of the animated object in a video game when the at least two animations are to be applied to the animated object;

a modelling unit trained to determine, based on the animation data and corresponding video game data, one or more blending coefficients for each animation, the or each blending coefficient defining a relative weighting with which each animation is to be applied to the animated object;

and a blending unit configured to blend the at least simultaneously applied part of the two animations together, in accordance with the or each blending coefficient determined for each animation, wherein the in-game variable comprises one or more of:

(i) a physical state of the animated object;
(ii) a stamina level associated with the animated object; and
(iii) a context associated with the animated object, where the context includes a scenario established by the video game application that is being experienced by the animated object.

11. The system according to claim 10, wherein the modelling unit is trained using supervised deep learning to determine a relationship between animation data and corresponding video game data, the modelling unit being trained with previously generated animation data and corresponding video game data; and wherein the previously generated animation data comprises combinations of animations applied to different animated objects and the blending coefficients associated therewith.

12. The system according to claim 10, wherein the animated object comprises a computer-generated character, the computer-generated character having a plurality of bones defining a skeleton of the character; and wherein each animation defines a different motion that is to be performed by at least some of the bones of the character.

13. The system according to claim 12, wherein the animation data comprises at least some of the bones of the computer-generated character and corresponding transforms, each transform defining at least one of a position, scale and orientation of a respective bone; and wherein the different motion of at least some of the character's bones for each animation is defined in terms of temporal variations in the transforms of those bones.

14. The system according to claim 10, wherein the in-game variable comprises a velocity vector associated with the animated object.

15. The system according to claim 10, wherein the modelling unit comprises a neural network trained to map animation data and corresponding video game data to blending coefficients.

* * * * *